Jan. 6, 1942.　　　　M. F. WEIDA　　　　2,269,388
EXTRUSION MOLDING MACHINE
Filed Dec. 27, 1937　　　2 Sheets-Sheet 1
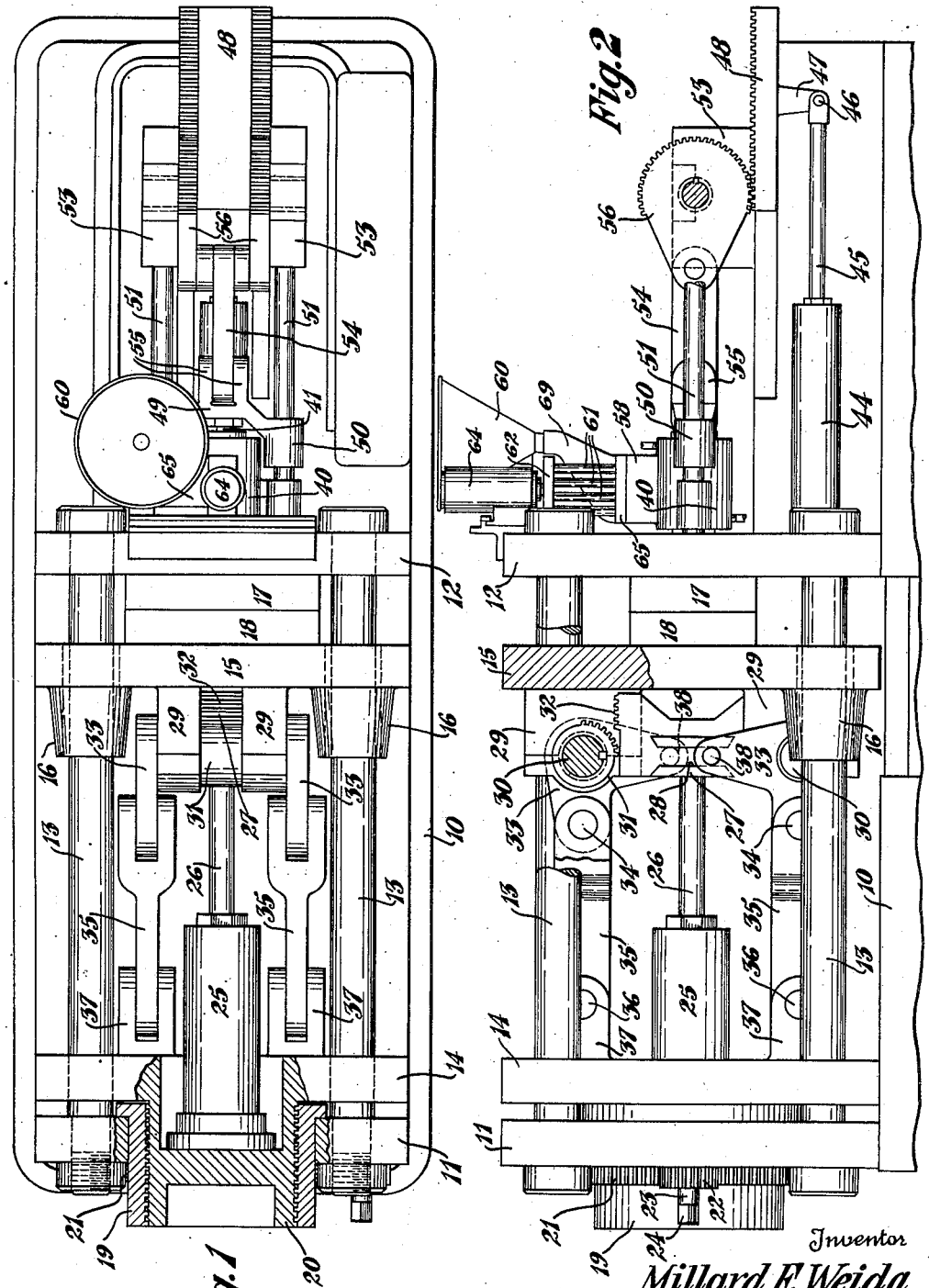
Inventor
Millard F. Weida
By Pease and Bishop
Attorneys

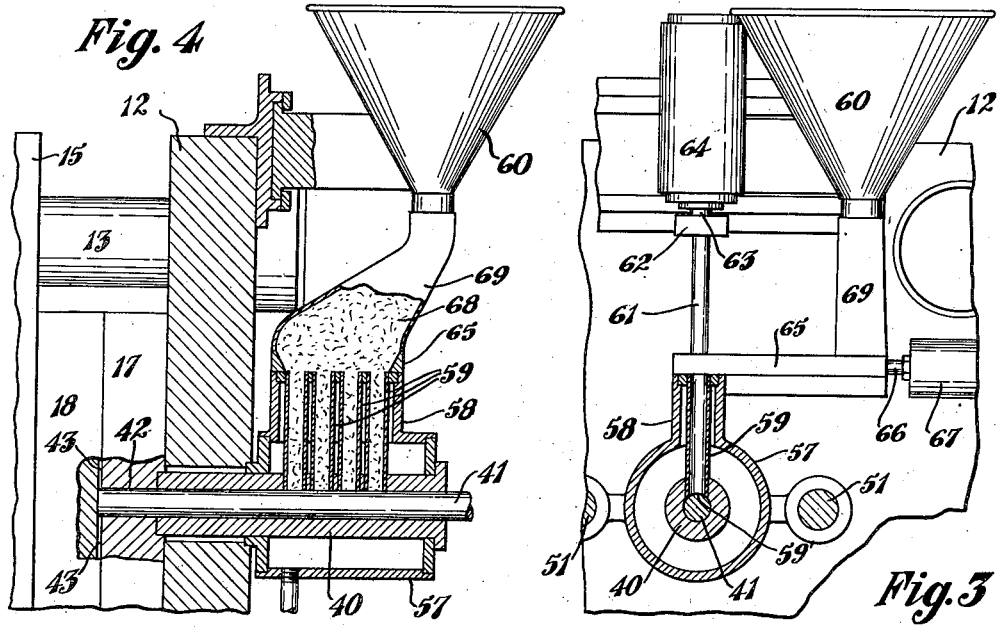
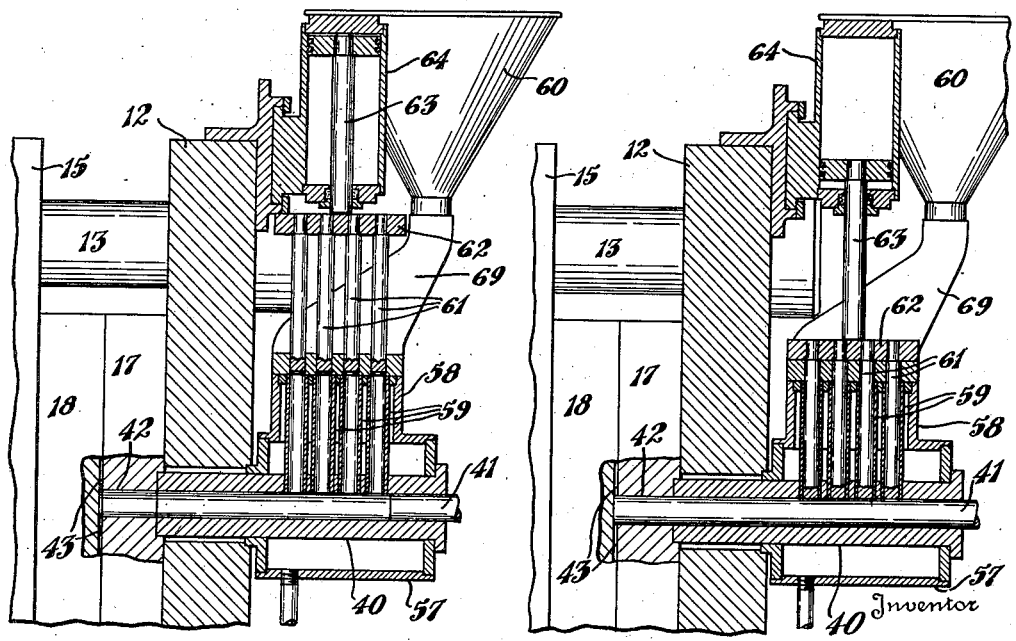

Patented Jan. 6, 1942

2,269,388

UNITED STATES PATENT OFFICE 2,269,388

EXTRUSION MOLDING MACHINE

Millard F. Weida, Louisville, Ohio

Application December 27, 1937, Serial No. 181,757

11 Claims. (Cl. 18—30)

The invention relates to machines for molding plastics and more particularly to the molding of such plastics as cellulose acetates and phenol formaldehyde.

Under present practice, plastics of this kind are molded by feeding the granular material from a hopper or the like into an injection cylinder in the forward end portion of which the material is heated to sufficient temperature to reduce the same to a plastic condition.

The granular material which has just been fed into the cylinder is then pushed forward into the heating chamber portion of the cylinder by a piston or the like pushing ahead of it the previous charge of material which has become plastic.

This plastic material is thus forced through a nozzle and into the mold cavity leaving the charge which has just been picked up in the heating chamber portion of the cylinder to be reduced to plastic condition.

Owing to the diameter of the cylinder required in such machines and the fact that this material is a poor conductor of heat and must be heated from the outside toward the center, difficulty is experienced by frequent burning of the material toward the outside before the material in the center of the cylinder becomes plastic.

It is therefore necessary in present machines to also depend on pressure for proper plasticity of the material and it is essential to get the material into the mold as quickly as possible, and with the greatest pressure. The most of the scrap produced under present practice is caused by slow movement of material which can not be overcome due to the fact that the flow of material is restricted through a small nozzle in order to reduce the material to the proper plastic state.

Since there is no positive measurement of material in the present machines it frequently happens that the machine will go through several cycles making misruns due to insufficient material being picked up by the injection piston.

Another objection to present practice is the fact that a considerable amount of scrap is caused by the production of a sprue. While this scrap may be reground and mixed with a plasticizer this causes a change in the color of the finished article thus making it impossible to use the reclaimed scrap for the same job of work.

The object of the present improvement is to overcome the difficulties and disadvantages of present practice by providing a molding machine which will accurately measure the charge of material so that the exact amount of material required is charged into the machine for each molding operation, the charge of material being heated in relatively small diameter tubes located directly above the injection cylinder, the plastic material being then forced under low pressure into the injection cylinder from which it is forced into the mold cavity with no restriction other than that created by the gates or runners and cavities of the mold, the material moving much faster than under present practice and the sprue which is necessary in present practice being entirely eliminated.

The above objects together with others which will be apparent from the drawings and following description or which may be hereinafter referred to may be obtained by constructing the improved molding machine in the manner illustrated in the accompanying drawings in which:

Figure 1 is a top plan view of the improved molding machine to which the invention pertains, parts being shown in section;

Fig. 2, a side elevation of the machine shown in Fig. 1 with parts broken away for the purpose of illustration;

Fig. 3, an enlarged detail elevation, partly in section showing the sliding hopper and plunger mechanism for injecting a charge of material into the machine;

Fig. 4, a detail sectional view through the injecting portion of the molding machine showing the sliding hopper in position to discharge material into the measuring and heating tubes;

Fig. 5, a similar view showing the piston withdrawn and the plungers in position to discharge the plastic material into the cylinder; and Fig. 6, a similar view showing the plungers in the lowered position and the piston in the operated position which it assumes in charging the plastic material into the mold.

Similar numerals refer to similar parts throughout the drawings.

The improved molding machine may be mounted upon a base indicated generally at 10 having the spaced stationary uprights 11 and 12 respectively located near one end of the base and at a point intermediate the ends thereof.

Guide rods 13 connect the uprights 11 and 12 near the four corner portions thereof, the head 14 being mounted for slidable adjustment upon said guide rods and the head 15 being slidably mounted upon the guide rods and provided with the bosses 16 for maintaining the head 15 parallel to the upright 12 as it is slidably moved upon the guide rods.

One portion of the mold, as indicated at 17 may be fixed upon the upright 12, the other portion 18 of the mold being fixed upon the sliding head 15 and adapted to cooperate with the mold portion 17 in the closed or operative position as shown in the drawings.

For the purpose of adjusting the head 14 relative to the upright 11, a tubular nut 19 is journaled within the upright 11 and engages the threaded extension 20 upon the adjustable head 14.

A gear 21 is fixed upon the nut 19 and meshes with a pinion 22 the shaft 23 of which is squared as at 24 to receive any suitable tool by means of which the pinion may be rotated to rotate the nut 19 and thus adjust the head 14 toward or from the upright 11.

A fluid cylinder 25 is carried by the adjustable head 14 and the piston rod 26 thereof carries a cross-head 27 provided with transverse grooves 28 upon opposite sides.

Spaced pairs of bearings 29 are carried by the sliding head 15, in each pair of said bearings is journaled a shaft 30 upon which is fixed a mutilated gear 31, adapted to mesh with the corresponding rack 32 upon the cross-head 27.

A bell crank lever 33 is fixed to each end of each of the shafts 30, one arm of said bell crank being pivotally connected, as at 34, to a link 35, which is pivotally connected, as at 36, to a lug 37 carried by the adjustable head 14. The other arm of each bell crank lever is provided with a stud 38 adapted to be received in the corresponding transverse groove 28 in the cross-head 27.

In order to adjust the press to accommodate any set of molds to be used therein, the pinion 22 is rotated, and through the gear 21 and nut 19 the adjustable head 14 is adjusted upon the guide rods 13 to the desired position.

When the plunger 26 is withdrawn within the cylinder 25 to open the molds, the first rearward movement of the cross-head 27 will, through the grooves 28 and studs 38, swing the bell crank levers 33 upon their pivots, the inner arms of these levers moving toward the cylinder while the outer arms swing outward at each side.

About the time that the studs 38 ride out of the grooves 28 the racks 32 will engage the mutilated pinions 31 causing a more rapid movement of the bell crank levers and quickly moving the sliding head 15, carrying the movable mold block 18 to the fully open position.

When closing the molds, the operation will be the reverse of that above described, the racks 32 and pinions 31 first rapidly moving the sliding head 15 and mold block 18 nearly to the closed position, after which the studs 38 will engage the grooves 28 in the cross-head moving the parts more slowly to the fully closed position. As the pivot points 34 of the bell crank levers and links pass over center the mold blocks will be held locked in closed position without the necessity of keeping on the pressure in the cylinder 25.

Upon the other side of the upright 12 is located the material measuring, heating and injecting mechanism. The injecting cylinder 40 may be fixed relative to the upright 12 and is preferably located through the same as shown in Figs. 4 and 6, and is provided with an injecting piston 41, which is adapted to be projected through a bore 42 extending entirely through the mold block 17 and communicating with the runners 43 in the mold which lead to the mold cavities as in usual practice.

The piston 41 may be reciprocated within the cylinder and bore 42 by any suitable means, a fluid operated cylinder 44 being shown in the drawings (Fig. 2) for this purpose. This cylinder is provided with a piston 45 connected at its outer end as shown at 46, to a lug 47 depending from the rack bar 48, which may have two spaced parallel rack teeth portions as shown in Fig. 1.

The injection piston 41 has a cross-head 49 fixed to its outer end, said cross-head being provided with the bearing sleeves 50 adapted to slide upon the guide rods 51 which are connected at opposite ends to the upright 12 and to the bearing blocks 53 mounted upon the base 10 at each side of the rack 48.

A connecting rod 54 is pivoted at one end to the ears 55 upon the cross-head 49 and at its other end to the gear segments 56 which mesh with the rack 48.

A housing 57 surrounds the injection cylinder 40 and has an upwardly disposed portion 58 within which is located a series of vertically disposed tubes 59 extending from the top of said housing to the bore of the cylinder 40, the lower ends of said tubes being rounded as indicated at 59' in Fig. 3 so as to fit snugly around the piston 41 when the same is in the forward or operative position as indicated in Figs. 4 and 6.

Transversely slidably located above the measuring and heating tubes 59 and arranged to be alternately brought into register therewith, is a hopper 60 and a series of plungers 61. These plungers may be connected to a head 62 carried by a piston rod 63 of a fluid operated cylinder 64 or other suitable means for vertically reciprocating the plungers.

The hopper 60 and the plungers 61 with their operating means are carried upon a transversely slidable frame 65 adapted to be moved as by the piston 66 of a fluid operated cylinder 67. The granular or powdered material, indicated at 68, from which the plastic articles are adapted to be molded, is carried in the hopper 60, the reduced depending lower end portion 69 of which is adapted to register with the upper ends of the tubes 59 when the parts are moved to the position shown in Fig. 4.

In this position the injection piston 41 should be in the forward position as shown in Fig. 4 so that the granular or powdered material will be fed by gravity from the hopper into the tubes 59 filling all of said tubes.

Since these tubes are so proportioned that they will measure accurately the exact amount of material required for one charge of the molds, an accurate measurement of the material is thus provided with each operation of the machine so as to provide sufficient material for one molding operation without any excess or waste material.

After the tubes 59 have been filled with the granular material the cylinder 67 may be operated to move the plungers 61 into position to register with the tubes 59. The material is quickly heated and reduced to a plastic condition of about the consistency of putty by any suitable and well-known heating means within the heating chamber.

This heating is preferably accomplished by circulating steam, hot oil or other heated fluid through the heating chamber although it should be understood that the desired temperature may be produced by electric heating means, gas, oil or other fuel.

When the material has reached the plastic state the injection piston 41 is withdrawn to the position shown in Fig. 5 and the cylinder 64 is operated to move the plungers 61 downward through the tubes 59 ejecting the plastic material from the tubes and discharging it into the injection cylinder 40.

The injection piston 41 is then operated to the position shown in Fig. 6 carrying the entire plastic charge forward and discharging it into the molds. As the plungers 61 remain in the lowered position during this operation it will be seen that the actual measured charge of material will be discharged from the cylinder 40 and into the molds, this charge being just sufficient to properly fill all of the mold cavities.

The operation is repeated as above described, the injection piston 41 remaining in the position shown in Fig. 6 while the plungers 61 are raised and the cylinder 67 operated to again move the hopper into position to register with the tubes 59 to deposit a new charge therein.

From the above it will be obvious that the difficulties and disadvantages of present practice are overcome by accurately measuring each charge of material so that the exact amount required for each molding operation is charged into the machine, heated to plastic condition and injected into the molds.

The material being heated in tubes of relatively small diameter obviates the possibility of burning any portion of the material before all portions thereof are reduced to plastic state. The plastic material is forced under low pressure into the injection cylinder from which it is forced into the mold cavity with no restriction other than that created by the runners and cavity of the mold, the material moves much faster than under present practice.

Since the injection piston moves through the mold to a point in direct communication with the runners thereof, the sprue which is produced under present practice is entirely eliminated thus avoiding a considerable waste which is necessary under present practice.

I claim:

1. An extrusion molding machine including a mold, an injection cylinder communicating with the mold, a piston in said cylinder, a series of substantially upright measuring and heating tubes communicating with the cylinder, a material-containing hopper adapted to discharge material into said tubes, plungers adapted to discharge the material from the tubes into the cylinder, means for alternately moving the hopper and the plungers into position to register with the tubes, and means for operating the piston for discharging the material from the cylinder into the mold.

2. An extrusion molding machine including a mold, an injection cylinder communicating with the mold, a piston in said cylinder, a series of substantially upright measuring and heating tubes communicating with the cylinder, a heating chamber surrounding said tubes, a material-containing hopper adapted to discharge material into said tubes, plungers adapted to discharge the material from the tubes into the cylinder, means for alternately moving the hopper and the plungers into position to register with the tubes, and means for operating the piston for discharging the material from the cylinder into the mold.

3. An extrusion molding machine including a stationary support, a head movable toward and from the support, complementary mold sections carried by the support and head, a plunger adapted to be reciprocated toward and from said head, bell crank levers carried by said head, interengaging means on the plunger and one arm of each bell crank, a link pivotally connected at one end to the other arm of each bell crank and at its other end to a normally stationary portion of the machine, a pinion carried by each bell crank, a rack carried by the plunger and adapted to engage each pinion, an injection cylinder communicating with the mold sections, and an injection piston in said cylinder for discharging plastic material from the cylinder into the mold sections.

4. An extrusion machine including a stationary support, a sliding head movable toward and from the support, complementary mold sections carried by the support and sliding head, an adjustable head, a plunger carried by the adjustable head and adapted to be reciprocated toward and from the sliding head, bell crank levers carried by the sliding head, interengaging means on the plunger and one arm of each bell crank, a link pivotally connected at one end to the other arm of each bell crank and at its other end to said adjustable head, a pinion carried by each bell crank, a rack carried by the plunger and adapted to engage each pinion, an injection cylinder communicating with the mold sections and an injection piston in said cylinder for discharging plastic material from the cylinder into the mold sections.

5. An extrusion machine including a spaced pair of stationary supports, guide rods connected to said supports, a sliding head mounted on said guide rods near one of said supports, complementary mold sections carried by said sliding head and the last named support, a nut swivelled in the other support, an adjustable head mounted upon said guide rods and having a threaded extension engaging said nut, a plunger carried by the adjustable head and adapted to be reciprocated toward and from the sliding head, bell crank levers carried by the sliding head, interengaging means on the plunger and one arm of each bell crank, a link pivotally connected at one end to the other arm of each bell crank and at its other end to said adjustable head, a pinion carried by each bell crank, a rack carried by the plunger and adapted to engage each pinion, an injection cylinder communicating with the mold sections and an injection piston in said cylinder for discharging plastic material from the cylinder into the mold sections.

6. An extrusion molding machine including a mold, an injection cylinder communicating with the mold, a piston in said cylinder, a series of substantially upright measuring and heating tubes communicating with said cylinder, a material containing hopper adapted to discharge material into said tubes, means for moving said hopper into position to register with said tubes so as to discharge material into the tubes by gravity, plungers adapted to discharge the material from the tubes into the cylinder, means for moving the plungers entirely through the tubes to the point of communication between the tubes and the cylinder so as to eject all of the material from the tubes and to cut off the communication between the tubes and the cylinder and means for operating the piston for discharging the material from the cylinder into the mold.

7. An extrusion molding machine including a mold, an injection cylinder communicating with the mold, a piston in said cylinder, a series of substantially upright measuring and heating tubes communicating with the cylinder, a heating chamber surrounding said tubes, a material containing hopper adapted to discharge material into said tubes, plungers adapted to discharge the material from the tubes into the cylinder, means for moving the plungers entirely through the tubes to the point of communication between the tubes and the cylinder so as to eject all of the material from the tubes and to cut off the communication between the tubes and the cylinder, means for alternately moving the hopper into and out of position to register with the tubes, and means for operating the piston for discharging the material from the cylinder into the mold.

8. An extrusion molding machine including a mold, an injection cylinder communicating with the mold, a piston in said cylinder, a series of substantially upright measuring and heating tubes communicating with the cylinder, a heating chamber surrounding said tubes, a material containing hopper adapted to discharge material into said tubes, plungers adapted to discharge the material from the tubes into the cylinder, means for moving the plungers entirely through the tubes to the point of communication between the tubes and the cylinder so as to eject all of the material from the tubes and to cut off the communication between the tubes and the cylinder, means for alternately moving the hopper into and out of position to register with the tubes, and means for operating the piston for discharging the material from the cylinder into the mold.

9. An extrusion molding machine including a mold, an injection cylinder communicating with the mold, a heating chamber surrounding said cylinder, a piston in said cylinder, a series of substantially upright measuring and heating tubes communicating with the cylinder, a heating chamber surrounding said tubes, a material containing hopper adapted to discharge the granular material into said measuring and heating tubes, means for alternately moving said hopper into position to register with the tubes, means for striking off the material deposited in the tubes to measure the volume of granular material for each injection cycle, a series of upright plungers in the upright tubes, and means for automatically moving the plungers through the tubes to compress material during the heating cycle, to discharge all the heated material into the injection cylinder when piston is in the back position and to entirely close the injection cylinder area by position of the plungers thereby preventing any back-up of material.

10. An extrusion molding machine including a mold, an injection cylinder communicating with the mold, a piston in said cylinder, a series of substantially upright tubes communicating with said cylinder, a material containing hopper, means for alternately moving said hopper into and out of position to register with the tubes for measuring each charge of material, a series of upright plungers in the tubes, means for moving said plungers in downward and upward motion, entirely through the tubes for discharging all the material from the tubes into the injection cylinder, the tube openings in the cylinder being closed off by means of the plunger ends which tend to make a relatively enclosed cylinder preventing any back-up of plastic material, and means for operating the piston to inject material from the cylinder into the mold.

11. An extrusion molding machine including a spaced pair of stationary forward and rear supports, guide rods connected to said supports, a sliding platen mounted on said guide rods, complementary mold sections carried on the forward support and the sliding platen, a nut rotatably mounted in the rear support, an adjustable head mounted upon said guide rods and having an externally threaded extension engaging said nut and providing lateral adjustment for mold thickness, a cylinder carried by the adjustable head, a plunger mounted in the cylinder and adapted to be reciprocated toward and from the sliding platen, levers carried on the platen, interengaging means on the plunger and levers, a link pivotally connected at one end to each lever and at the other end to the adjustable head, an injection cylinder communicating with the mold sections and an injection piston in said cylinder for discharging plastic material from the cylinder into the mold cavities.

MILLARD F. WEIDA.